United States Patent
Morowsky et al.

(10) Patent No.: US 11,356,137 B2
(45) Date of Patent: Jun. 7, 2022

(54) CONSOLIDATION OF CONTROLS ON AN AIRCRAFT RADIO

(71) Applicant: HONEYWELL INTERNATIONAL INC., Morris Plains, NJ (US)

(72) Inventors: Katarina A. Morowsky, Corvallis, OR (US); Ivan Sandy Wyatt, Scottsdale, AZ (US); Christopher Heine, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 280 days.

(21) Appl. No.: 16/817,276

(22) Filed: Mar. 12, 2020

(65) Prior Publication Data

US 2020/0295794 A1    Sep. 17, 2020

Related U.S. Application Data

(60) Provisional application No. 62/818,509, filed on Mar. 14, 2019.

(51) Int. Cl.
*H04B 1/38* (2015.01)
*B64D 43/00* (2006.01)

(52) U.S. Cl.
CPC .............. *H04B 1/38* (2013.01); *B64D 43/00* (2013.01)

(58) Field of Classification Search
CPC ... H04B 1/38; H04B 1/40; H04B 1/44; H04B 7/18506; B64D 43/00; G08G 5/0021
See application file for complete search history.

(56) References Cited

U.S. PATENT DOCUMENTS

| 6,282,417 | B1 | 8/2001 | Ward |
| 6,664,945 | B1 | 12/2003 | Gyde et al. |
| 2002/0065586 | A1 | 5/2002 | Sample |
| 2010/0042273 | A1* | 2/2010 | Meunier ............... G05D 1/0607 701/9 |
| 2016/0103579 | A1* | 4/2016 | Coulmeau ............ G08G 5/0021 701/533 |
| 2017/0183105 | A1* | 6/2017 | Fournier ................ B64D 45/00 |
| 2020/0175628 | A1* | 6/2020 | Srinivasan ........... G06Q 50/265 |

* cited by examiner

*Primary Examiner* — Thanh C Le
(74) *Attorney, Agent, or Firm* — Lorenz & Kopf, LLP

(57) ABSTRACT

Methods and apparatus are provided for displaying the operational parameters of a radio system located onboard an aircraft. The apparatus comprises a permanent radio display bar that shows an active radio frequency in use by the radio system and a variable radio display pad. The variable radio display pad shows multiple historical past radio frequencies previously used by the radio system and multiple predicted future radio frequencies for use along a flight plan of the aircraft. It includes a change command that allows a crew member to manually change the active radio frequency in the permanent radio display bar.

17 Claims, 3 Drawing Sheets

CONSOLIDATION OF CONTROLS ON AN AIRCRAFT RADIO

CROSS-REFERENCE TO RELATED APPLICATION(S)

This application claims priority from U.S. Provisional Patent App. No. 62/818,509, titled "CONSOLIDATION OF CONTROLS ON AN AIRCRAFT RADIO" that was filed Mar. 14, 2019

TECHNICAL FIELD

The present invention generally relates to avionics systems, and more particularly relates to a consolidation of controls on an aircraft radio.

BACKGROUND

Within the aviation electronics, there is a push to replace hard controllers on the flight deck with touchscreen controllers. With this trend, there is greater functionality being pushed onto a single display. Consequently, screen real estate is more limited and clutter on the display becomes and increasing problem. Hence, there is a need for consolidation of controls on an aircraft radio.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An apparatus is provided for displaying the operational parameters of a radio system located onboard an aircraft. The apparatus comprises: a permanent radio display bar that shows an active radio frequency in use by the radio system; and a variable radio display pad that shows, multiple historical past radio frequencies previously used by the radio system, multiple predicted future radio frequencies for use along a flight plan of the aircraft, and a change command that allows a crew member to manually change the active radio frequency in the permanent radio display bar.

A method is provided for displaying the operational parameters of a radio system located onboard an aircraft. The method comprises: displaying an active radio frequency in use by the radio system on a permanent radio display bar; displaying multiple historical past radio frequencies previously used by the radio system on a variable radio display pad; displaying multiple predicted future radio frequencies for use along a flight plan of the aircraft on the variable radio display pad; and displaying a change command that allows a crew member to manually change the active radio frequency on the permanent radio display bar.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An apparatus that consolidates the controls of an aircraft radio has been developed. The apparatus displays the operational parameters of a radio system on board an aircraft. The apparatus includes a permanent radio display bar that shows an active radio frequency in use by the radio system. The apparatus also has a variable radio display pad that shows: multiple historical past radio frequencies previously used by the radio system; multiple predicted future radio frequencies for use along a flight plan of the aircraft; and a change command that allows a crew member to manually change the active radio frequency in the permanent radio display bar.

Figure 1:
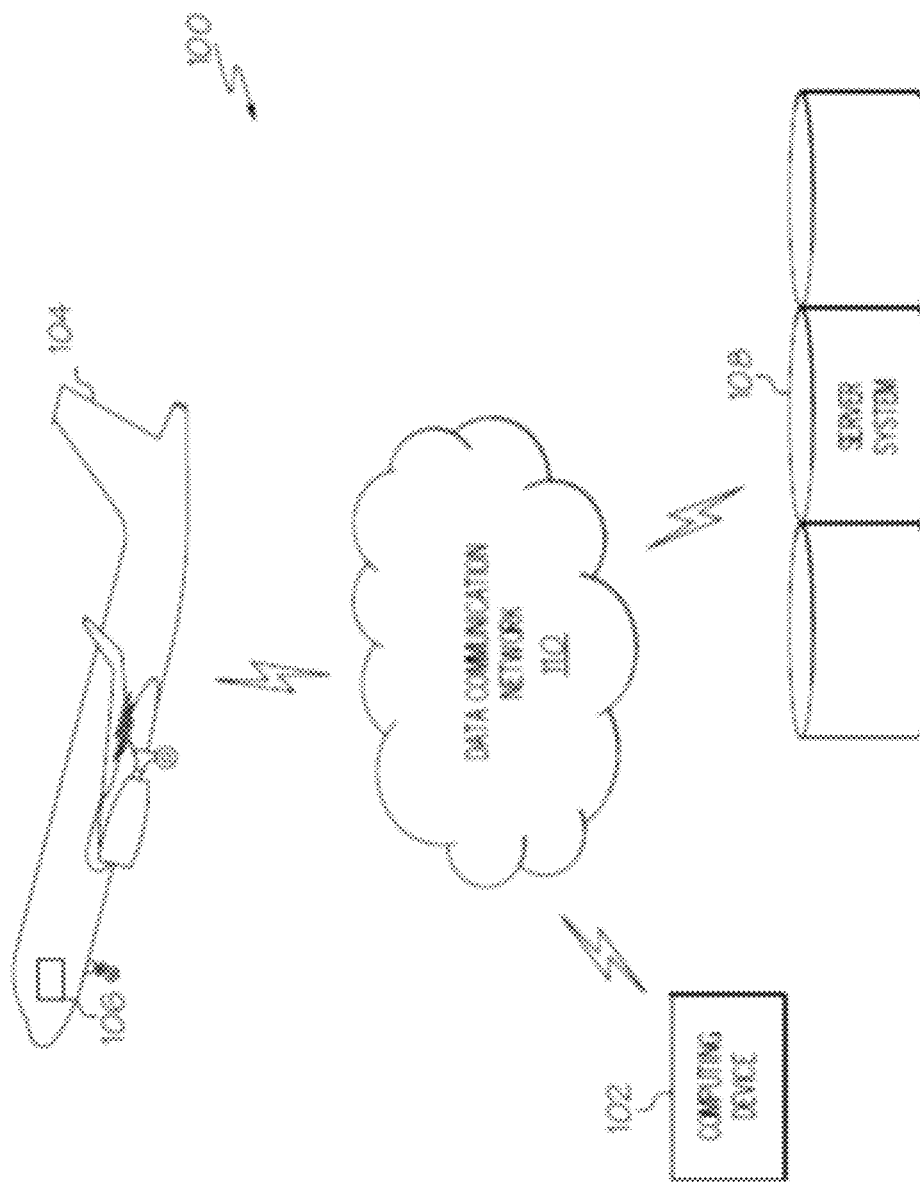
FIG. 1 is a diagram of aircraft computer system in accordance with the disclosed embodiments.

Turning now to the figures, FIG. 1 is a diagram of aircraft computer system 100, in accordance with the disclosed embodiments. The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing Electronic Flight Bag (EFB) applications. In other embodiments, the computing device 102 may be implemented using a computer system onboard the aircraft 104.

The aircraft 104 may be implemented as an airplane, helicopter, spacecraft, hovercraft, or the like. The one or more avionics systems 106 may include a Flight Management System (FMS), navigation devices, weather detection devices, radar devices, communication devices, brake systems, and/or any other electronic system or avionics system used to operate the aircraft 104. Data obtained from the one or more avionics systems 106 may include, without limitation: flight data, aircraft heading, aircraft speed, aircraft position, altitude, descent rate, position of air spaces surrounding a current flight plan, activity of air spaces surrounding a current flight plan, or the like.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data. Such data may include, without limitation: flight plan data, aircraft parameters, avionics data and associated user actions, and other data compatible with the computing device 200.

The computing device 102 is usually located onboard the aircraft 104, and the computing device 102 communicates with the one or more avionics systems 106 via wired and/or wireless communication connection. The computing device 102 and the server system 108 may both be located onboard the aircraft 104. In other embodiments, the computing device 102 and the server system 108 may be disparately located, and the computing device 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
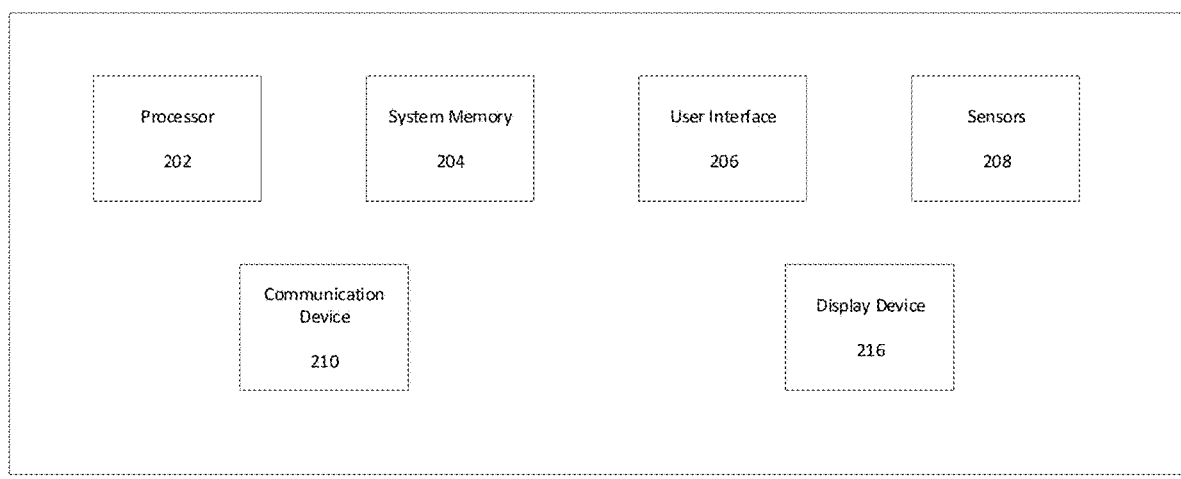
FIG. 2 is a functional block diagram of a computing device 200, in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a very high frequency (VHF) radio, a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan, predicted radio frequencies), and other data compatible with the computing device 200. Data provided by the communication device 210 may include, without limitation, requests for avionics systems data, alerts and associated detail for display via an aircraft onboard display, and the like.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
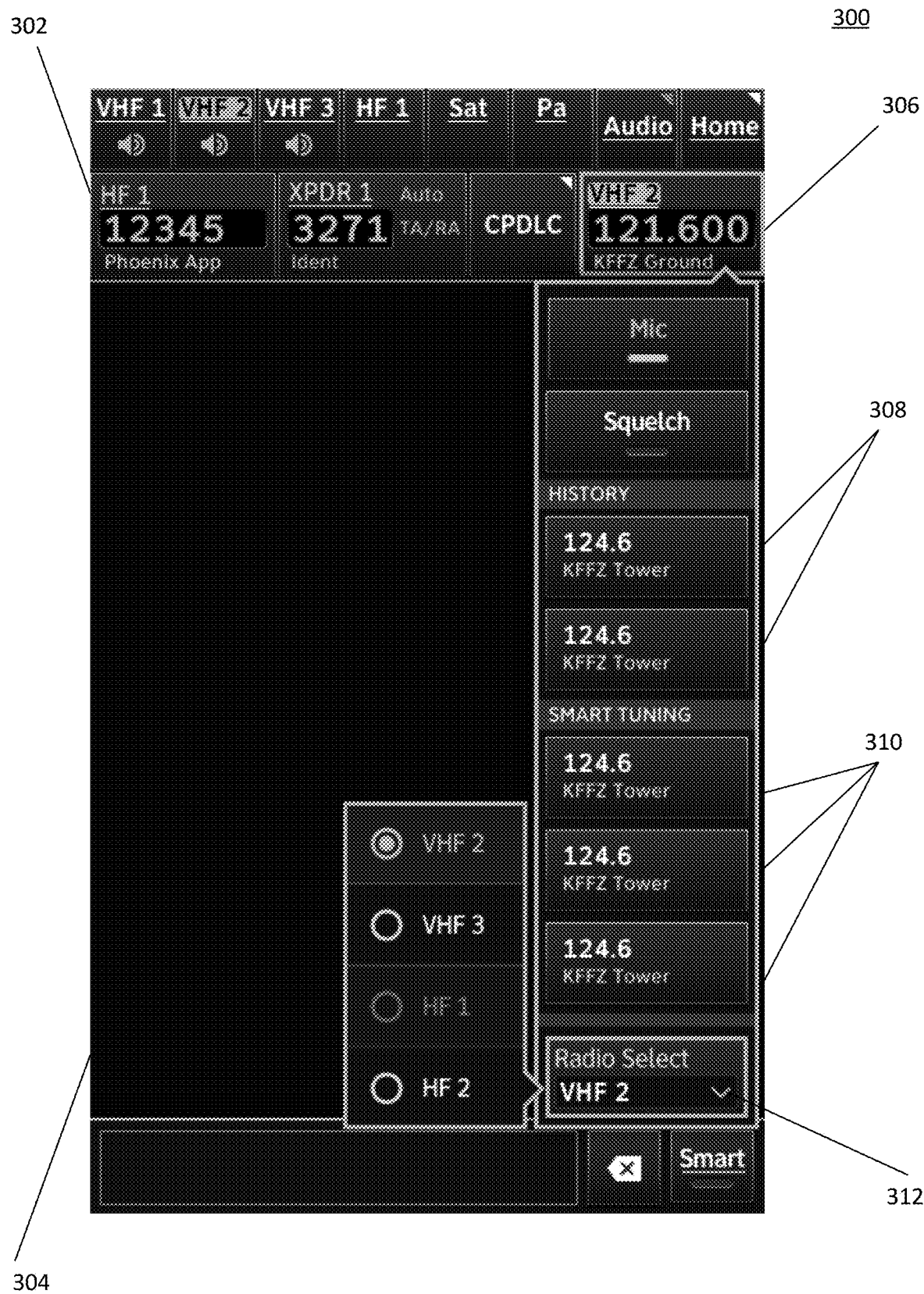
FIG. 3 is a display for a very high frequency (VHF) radio located on board an aircraft in accordance with the disclosed embodiments.

FIG. 3 shows a display 300 for a very high frequency (VHF) radio located on board an aircraft in accordance with the disclosed embodiments. The VHF radio corresponds to the communications device 210 shown previously in FIG. 2 as an example embodiment. The display 300 includes a permanent radio bar 302 that shows the current active radio frequency 306 that is presently in use by the radio system. The display 300 also has a variable radio display pad 304 that shows historic radio frequencies 308 that were previously used by the radio system. The display pad 304 also shows predicted radio frequencies 310 that are anticipated to be used along the flight plan of the aircraft. A selection button 312 is also part of the display pad 304 for use as a selection mechanism in this example. The selection button 312 is used by aircrew members to manually change the active radio frequency 306 in use and shown in the permanent radio bar 302. Other selection mechanisms examples may include a dial, a keypad, a touchscreen or a screen cursor. In this embodiment, the display is used for a VHF radio system. However, in alternative embodiments other types of radio systems could be used including high frequency (HF) radio systems. In still other embodiments, the variable radio display pad 304 may be a touchscreen type device.

This display 300 allows users to access to past frequencies previously used along the flight. The historical radio frequencies list 308 provides a "life-line" in case pilots lose contact with the controller while changing frequencies. The historical frequency list 308 allows for quick error recovery in the event that the wrong frequency was tuned. Additionally, the display 300 accesses a predictive smart tuning frequency list that lessens the pilot workload in tuning (e.g., typing, dialing, etc.) a frequency.

A user can use the variable radio display pad 304 to pre-set/stage multiple frequencies. When the user is ready to make a staged frequency the active frequency they can select the staged frequency with a selection button 312 and move the frequency to the active frequency data field by touching the data field. If the user made an error and tuned the wrong frequency, they could access the list of historical radio frequencies 308 and select a historic frequency would be moved to the active frequency field 306. If the user did not know how to establish contact with a new air traffic control (ATC) along the flight plan, they could select the list of predicted radio frequencies 310. The user could use the selection button 312 the predicted frequency would be moved to the active frequency field 306.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus for displaying the operational parameters of a radio system located onboard an aircraft, comprising:
    a permanent radio display bar that shows an active radio frequency in use by the radio system; and
    a variable radio display pad that shows,
        multiple historical past radio frequencies previously used by the radio system,
        multiple predicted future radio frequencies for use along a flight plan of the aircraft, and
        a change command that allows a crew member to manually change the active radio frequency in the permanent radio display bar.

2. The apparatus of claim 1, where the radio system is a very high frequency (VHF) radio system.

3. The apparatus of claim 1, where the radio system is a high frequency (HF) radio system.

4. The apparatus of claim 1, where the radio system is a satellite uplink/downlink communication system.

5. The apparatus of claim 1, where the radio system is a wide area local network (WLAN).

6. The apparatus of claim 1, where the radio system is a cellular network.

7. The apparatus of claim 1, where the display pad includes a selection mechanism that allows the crew member to enter a change command.

8. The apparatus of claim 7, where selection mechanism is a touchscreen device.

9. The apparatus of claim 7, where selection mechanism is a selection button.

10. The apparatus of claim 7, where selection mechanism is a selection dial.

11. The apparatus of claim 7, where selection mechanism is a keypad.

12. The apparatus of claim 7, where selection mechanism is screen cursor.

13. The apparatus of claim 1, where the radio system automatically adds the current radio frequency into the historical past radio frequencies upon changing the current radio frequency.

14. The apparatus of claim 1, where the predicted future radio frequencies are entered manually by the crew member as pre-set frequencies.

15. The apparatus of claim 1, where the predicted future radio frequencies are entered automatically by the radio system based on the flight plan.

16. The apparatus of claim 1, where the predicted future radio frequencies comprise air traffic control frequencies for use along the flight plan.

17. A method for displaying the operational parameters of a radio system located onboard an aircraft, comprising:

displaying an active radio frequency in use by the radio system on a permanent radio display bar;

displaying multiple historical past radio frequencies previously used by the radio system on a variable radio display pad;

displaying multiple predicted future radio frequencies for use along a flight plan of the aircraft on the variable radio display pad; and displaying a change command that allows a crew member to manually change the active radio frequency on the permanent radio display bar.

* * * * *